(12) United States Patent
Carson

(10) Patent No.: US 6,254,247 B1
(45) Date of Patent: Jul. 3, 2001

(54) ILLUMINABLE CONTAINERS AND METHOD

(75) Inventor: Anthony Reed Carson, Waynoka, OK (US)

(73) Assignee: Redgate Industries, Inc., Waynoka, OK (US)

( * ) Notice: Subject to any disclaimer, the term of this patent is extended or adjusted under 35 U.S.C. 154(b) by 0 days.

(21) Appl. No.: 09/231,008

(22) Filed: Jan. 14, 1999

(51) Int. Cl.$^7$ .................................................. F21W 131/30
(52) U.S. Cl. ............................ 362/101; 362/154; 359/32
(58) Field of Search .................................... 362/101, 154, 362/96; 359/1, 2, 3, 8, 32, 33

(56) References Cited

U.S. PATENT DOCUMENTS

| | | | |
|---|---|---|---|
| 4,390,928 | 6/1983 | Runge | 362/101 |
| 4,771,902 | 9/1988 | Teng | 215/1 |
| 4,836,476 | 6/1989 | Wolf | 248/146 |
| 5,171,081 | 12/1992 | Pita et al. | 362/34 |
| 5,178,450 * | 1/1993 | Zelensky et al. | 362/101 X |
| 5,339,548 | 8/1994 | Russell | 40/324 |
| 5,504,663 * | 4/1996 | Tucker | 362/101 |
| 5,575,553 | 11/1996 | Tipton | 362/101 |
| 5,624,177 | 4/1997 | Rosaia | 362/101 |
| 5,662,406 | 9/1997 | Mattice et al. | 362/101 |
| 5,671,998 | 9/1997 | Collet | 362/101 |
| 5,743,620 * | 4/1998 | Rojas et al. | 362/101 |
| 5,785,407 | 7/1998 | Ratcliffe et al. | 362/101 |
| 5,822,088 * | 10/1998 | Danno et al. | 362/806 X |
| 5,938,318 * | 8/1999 | Mattsen | 362/101 X |

FOREIGN PATENT DOCUMENTS 62-250472 * 10/1987 (JP) ........................................ 359/32

* cited by examiner

Primary Examiner—Laura K. Tso
(74) Attorney, Agent, or Firm—McAfee & Taft

(57) ABSTRACT

The disposable liquid beverage container of the present invention comprises a first compartment for sealably containing a beverage and a second compartment adjacent the first compartment. A barrier having a translucent portion separates the first and second compartments. A light source and an energy source electrically connected to the light source are disposed in the second compartment. A switch activates the light source such that the light source shines through the translucent portion of the barrier and illuminates the beverage disposed in the first compartment of the container. A holographic image embedded in a film attached to an outside of the container is created within the first compartment when the light source is illuminated. Methods are also provided.

36 Claims, 3 Drawing Sheets

ILLUMINABLE CONTAINERS AND METHOD

BACKGROUND OF THE INVENTION

This invention relates generally to containers and more particularly, but not by way of limitation, to disposable beverage containers which can be illuminated.

Beverage containers are commonplace and exist in a variety of sizes and materials. For example, beverage containers sold for consumption are typically sized from a few ounces up to three liters or more and are constructed of glass, plastic, aluminum, metal and other materials.

Primarily for novelty, but also for a variety of other reasons such as safety and visibility, efforts have previously been attempted to illuminate beverage containers and related items. For example, U.S. Pat. No. 4,390,928 to Runge, which is incorporated by reference herein, describes a liquid drink container having a lamp and a battery. The lamp is activated by a motion sensor. U.S. Pat. No. 5,671,998 to Collet, which is incorporated by reference herein, relates to a container for liquids having a chemiluminescent light to illuminate the liquid therein. In addition to cups and containers, lighting mechanisms have been added to decanting baskets as described in U.S. Pat. No. 4,836,476 to Wolf, which is incorporated by reference herein, and to baby bottles as described in U.S. Pat. No. 5,662,406 to Mattice et al., which is incorporated by reference herein.

These prior attempts to illuminate beverage containers have several shortcomings. For example, prior efforts are neither compatible with nor readily adaptable to a single serve, disposable beverage container such as a sealed carbonated beverage bottle. Many of the prior attempts describe a battery source such as alka- line or nickel cadmium, which either will not function or will function poorly in temperature ranges at which beverages are often served, e.g., below 45° F. Also, many of the prior attempts result in a container which is too expensive to be discarded or recycled after use which is commonplace with beverage containers. Further, the prior attempts are not well suited for a disposable beverage container in terms of use, submersibility, reliability of the light switch, power consumption and/or the ability to maintain a pressure in a carbonated beverage. Furthermore, other attempts fail to include enhancements to increase the novelty aspect of the container such as holographic image capability.

Thus, there is a need for improved illuminable containers and methods which are compatible with single serve, disposable beverage containers in terms of use, operating temperature, cost, submersibility, reliability of the light switch, power consumption, the ability to maintain a pressure in a carbonated beverage and enhancements to increase the novelty aspect of the container.

SUMMARY OF THE INVENTION

The present invention provides improved illuminable containers and methods which meet the needs described above and overcome the shortcomings of the prior art.

The disposable liquid beverage container of the present invention comprises a first compartment for sealably containing a beverage, a second compartment adjacent the first compartment and a barrier having a translucent portion separating the first and second compartments. A light source and an energy source electrically connected to the light source for providing current to the light source are disposed in the second compartment. The container also includes switch means for activating the light source such that the light source shines through the translucent portion of the barrier and illuminates the fluid disposed in the first compartment of the container.

The method of illuminating a fluid in a container comprises providing a submersible container having a first compartment containing a fluid, a second compartment sealably attached to the first compartment, a light source secured in the second compartment, a battery secured in the second compartment and electrically connected to the light source, and a switch for activating the light source. The switch has a pull ring connected to a non-conductive strip interposed between a pole on the battery and a lead on the light source. The method also comprises pulling the pull ring of the switch whereby the non-conductive strip is removed between the pole on the battery and the lead on the light source such that current flows between the battery and the light source effecting illumination of the fluid contained in the first compartment.

It is therefore a general object of the present invention to provide improved illuminable containers and methods. Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
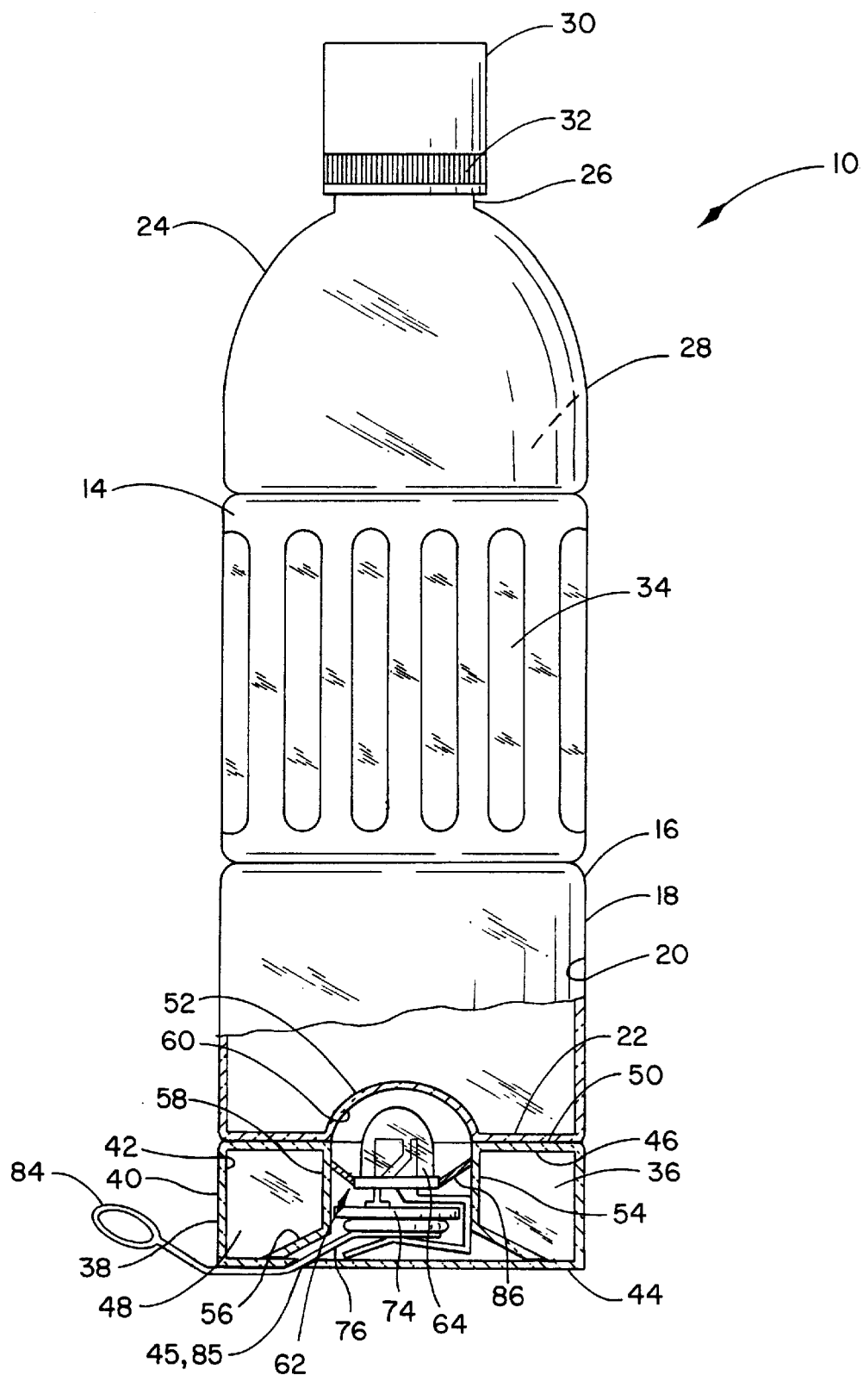
FIG. 1 is a partially sectioned elevation view of a preferred embodiment of the present invention.

Referring to the drawings, a presently preferred embodiment of the invention and its operation is illustrated. Like reference numerals generally refer to like parts throughout the drawings and this description.

Referring to FIG. 1, the illuminable apparatus of the present invention is illustrated and designated generally by the numeral 10. Apparatus 10 is for containing a beverage and includes a container designated generally by the numeral 12. As defined herein, "container" includes all apparatus capable of containing a fluid of any type, specifically including but not limited to water, carbonated beverages, juices and air. In a preferred embodiment, container 12 is cylindrical and adapted to contain a single serve beverage (e.g., 8 to 20 ounces and most typically 12 to 16 ounces) for human consumption such as water or a carbonated beverage. Container 12 is preferably formed of plastic and is disposable. As used herein, "disposable" means that when empty container 12 is not of significant cost or value such that it can be discarded or recycled as is presently common with existing plastic beverage containers and aluminum cans.

Container 12 has a first compartment 14 adapted for sealably containing a fluid such as a beverage. First compartment 14 is preferably cylindrical in shape formed by a cylindrical wall 16 which creates an exterior surface 18 which can be grasped by the consumer and an interior surface 20 which contacts the beverage. First compartment 14 has a mostly circular bottom portion 22 connected to a lower portion of wall 16. First compartment 14 also has a top portion connecting to an upper portion of wall 16. The volume created by wall 16, bottom portion 22 and top portion 24 forms a first cavity 28 where a beverage can be stored.

Top portion 24 of first compartment 14 is preferably frustoconical in shape or bullet nosed terminating in a sealable end 26. The sealability of the end 26 is desirable to maintain the pressure or carbonation of a carbonated beverage and to prevent foreign matter from contaminating the beverage. End 26 may be sealed by any number of means specifically including a threaded connection such as is presently used for conventional beverage containers. End 26 preferably terminates with threads (not shown) disposed on the exterior portion of cylindrical end 26. A cap 30 is internally threaded (not shown) for matingly connecting to threaded end 26. Cap 30 may include a knurl pattern 32 or other pattern to aid in removal of the cap by a consumer.

Wall 16 of first compartment 14 may also include a spline pattern 34, a dimpling effect or other distortions in wall 16 to increase the ease with which container 12 may be grasped by a consumer and/or to improve aesthetics. In addition, surface distortions in wall 16 will have a visual impact when container 12 is illuminated, as explained later.

Container 12 also includes a second compartment 36 for housing the electronic components 62 of the present invention. Second compartment 36 is connected or attached adjacent and preferably immediately below first compartment 14. Second compartment 36 is preferably cylindrical in shape formed by a cylindrical wall 38 which creates an exterior surface 40 and an interior surface 42. Second compartment 36 has a bottom 44, which in a preferred embodiment also serves as the bottom of container 12, and a top 46. Bottom 46 and top 46 connect with wall 38 such than an interior cavity 48 is formed within second compartment 36. It is important that second compartment 36 is sealed such that container 12 may be submersed without adversely affecting operation of electronic components 62.

A barrier 50 sealably separates first compartment 14 from second compartment 36. In other words, a beverage in first compartment 14 cannot communicate with second compartment 36. Barrier 50 is formed by a bottom portion 22 of first compartment and top 46 of second compartment 36. In a preferred embodiment, however, barrier 50 is a single piece of plastic material which functions both as bottom portion 22 of first compartment 14 and as top 46 of second compartment 36. Barrier 50 includes a translucent portion to allow light from light source 64 to pass into cavity 28 of first compartment 14. Preferably, bulbous protrusion 52 is formed of translucent material. It is important that barrier 50 forms a seal between first compartment 14 and second compartment 36 to prevent fluid or liquid in first compartment 14 from contacting the electrical components housed in second compartment 36. Barrier 50 may also include a bulbous protrusion 52 which extends into the first compartment 14.

Second compartment 36 has an electronics housing 54 disposed therein. Housing 54 contains most of the electronics components 62 of the present invention. From bottom to top, housing 54 has a frustoconical portion 56 connected to a cylindrical portion 58 connected to a dome 60. Dome 60 is preferably integral with bulbous protrusion 52 of barrier 50. Housing 54 is centrally located within interior cavity 48 of second compartment 36, but may extend into first compartment 14, for example, bulbous protrusion 52.

Container 12 includes reflective means for reflecting light from light source 64 toward first compartment 14. Reflective means preferably is a reflector disposed in second compartment 36. In a preferred embodiment, reflector 86 has an inverted frustoconical shape disposed in electronics housing 54 as illustrated in FIG. 1. Additional means for reflecting light toward first compartment 14 include a reflective material coated on an inside surface of cylindrical portion 58 of electronics housing 54.

Figure 2:
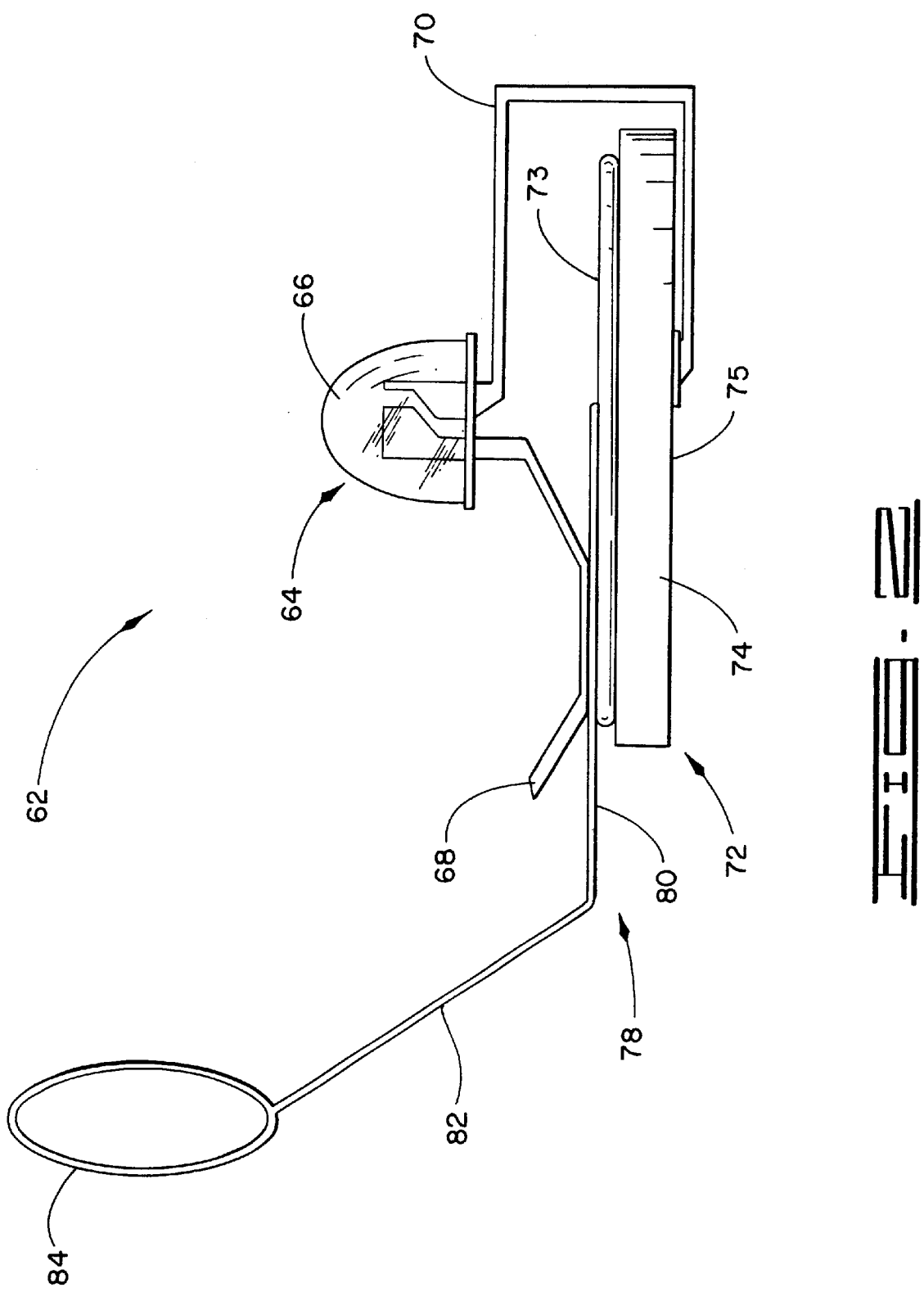
FIG. 2 is an elevation view of the electronic components of the present invention.

Referring to FIGS. 1 and 2, electronic components 62 are housed within second compartment 36, and more specifically, within electronics housing 54. Generally, electronic components 62 include a light source 64, an energy source 72 electrically connected to light source 64 for providing current to light source 64 and a switch 76 electrically interposed between light source 64 and energy source 72 for activating light source 64.

Light source 64 can be any apparatus or method for producing light including but not limited to incandescent lighting, light emitting diodes and electroluminescence. In a preferred embodiment, light source 64 is a light emitting diode (hereinafter referred to as "LED"). Good results have been achieved with a high intensity LED 66, such as the T 1¼ 30,000 MCD (mean candle power) available from Hewlett Packard. An LED is the preferred light source 64 because of its high energy to light conversion and low heat variation and loss when compared to an incandescent light. Further, LED 66 has a higher intensity and uses less energy than a conventional light source. LEDs are available in multiple colors and multiple colored LEDs can be used in the present invention. In addition, the color of bulbous protrusion 52 can be varied to achieve a similar result to a colored LED.

LED 66 includes two leads, namely a positive lead 68 and a negative lead 70. Preferably leads 68, 70 possess sufficient rigidity and spring to aid in retaining energy source 72 and operating switch 76 as is further explained in greater detail.

Electronic components 62 include an energy source 72 to power, energize and cause illumination of light source 64. Energy source 72 may be any means or apparatus for supplying current to light source 64. Energy source 72 may be a battery 74 such as a nickel cadmium-based battery, alkaline-based battery or a lithium-based battery. Preferably, battery 74 is a lithium-based battery capable of operating in a temperature range from about −15° F. to about 80° F. so that light source 64 will still function under the ordinary (and even somewhat extraordinary) conditions that a typical beverage container undergoes. It is especially important that battery 74 be capable of illuminating light source 64 at a temperature range from about 32° F. to about 45° F., the common temperature range at which beverages are maintained, served and consumed. A lithium-based battery is preferred since nickel cadmium and alkaline-based batteries either function poorly or not at all at temperatures below 45° F. The lithium battery is preferably sized from about CR1212 (12 millimeters in diameter, 1.2 millimeter thick) to about CR2032 (20 millimeters in diameter, 3.2 millimeters thick) to fit within electronics housing 54 and to provide illumination of LED 66 from about 0.5 to 10 hours. The CR1212 lithium battery 74 has been found to produce the best results in terms of size, providing illumination of LED 66 for about 10 hours.

Switch 76 effects current flow from battery 74 to light source 64. In a preferred embodiment, switch 76 is a pull tab type switch 78. Pull tab 78 includes a non-conductive member 80 which is a strip composed of a non-conductive material. An intermediate member 82 of pull tab 78 attaches to an end of conductive member 80. A pull ring 84 of any size or shape attaches to the other end of intermediate member 80 and is preferably attached to an exterior surface 18 of container 12. Intermediate member 82 extends through an aperture 45 in bottom 44 of the second compartment so that switch 76 can be operated from the outside of the electronics housing 54. A seal member 85 such as a rubber grommet provides a seal means to prevent fluid from entering electronics housing 54. Thus, seal member 85 facilitates the submersibility of container 12 such as in an ice chest, etc.

Non-conductive member 80 of pull tab 78 is positioned between a pole 73, 75 of battery 74 and a lead 68, 70 of light source 64. Preferably, non-conductive member 80 is interposed between positive lead 68 of LED 66 and positive pole 73 of battery 74. Positive lead 68 of LED 66 is spring loaded such that when non-conductive member 80 of pull tab 78 is removed, positive lead 68 contacts the positive pole 73 to close the circuit and cause current flow between battery 74 and LED 66 thereby effecting illumination of LED 66.

In alternate embodiments, switch 76 can be virtually any ON/OFF switch to effect current flow between energy source 72 and light source 64. For example, a PNP transistor and an aluminum strip could be used as a touch sensor switch. In addition, a pressure switch located anywhere on the bottle will work as well. It is also envisioned that the switch could be activated, i.e., the circuit closed, when cap 30 is removed from container 12 and optionally deactivated when cap 30 is replaced on container 12. In still another embodiment, switch 76 could be activated by the weight of container 12 such that when container 12 is placed on a flat surface, the weight of container 12 maintains switch 76 in an OFF position and when container 12 is removed from the flat surface switch 76 is in an ON position such that light source 64 is illuminated. It is noted that the light source 64 such as an LED 66 can be in a normally ON or normally OFF state allowing switch 76 to produce the opposite effect, namely, if OFF then ON, or if ON then OFF.

In an assembled condition leads 68, 70 of LED 66 electrically connect and physically attach LED 66 to battery 74. Leads 68, 70 provide sufficient rigidity and spring to maintain LED 66 adjacent battery 74 and to maintain non-conductive member 80 of pull tab switch 78 in a position between positive lead 68 and positive pole 73 of battery 74.

Electronic components 62 are positioned within and preferably attached to housing 54. Electronic components 62 are attached to housing 54 by using a doping compound such as methyl ethyl ketone ("MEK") or acetone to bond the lens of LED 66 which is comprised of gallium arsenide to bulbous protrusion 52 of barrier 50. This type of bonding has the added benefit of creating a lensing effect which enhances illumination of the liquid in cavity 28 of first compartment 14.

Figure 3:
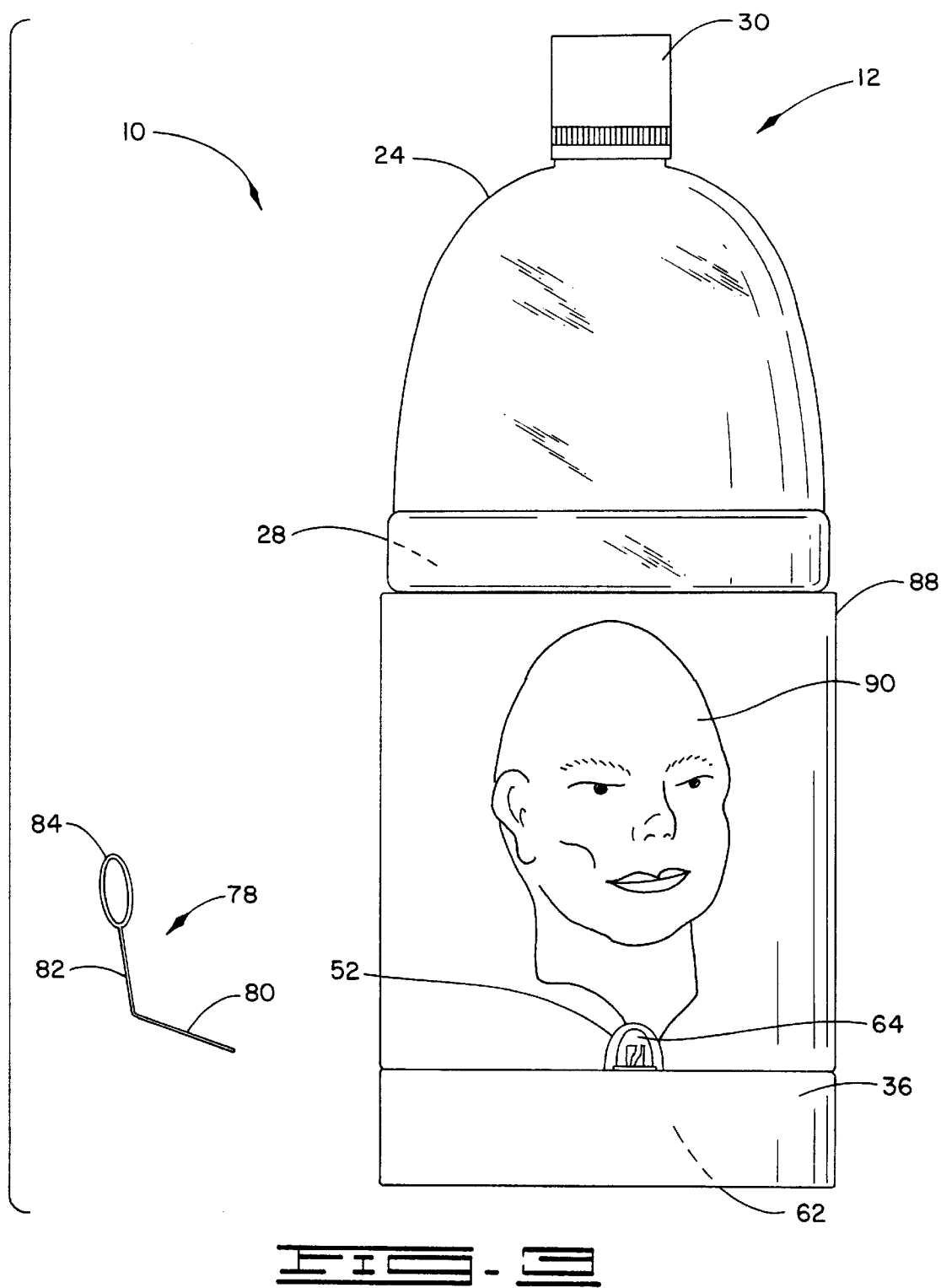
FIG. 3 is an elevation view of an embodiment showing a holographic image.

Referring to FIG. 3, container 12 may also include a film 88 having a holographic image incorporated into film 88. The film is preferably attached to exterior surface 18 of first compartment 14. However, film 88 can also be attached to interior surface 20 of first compartment 14 or incorporated into wall 16. Film 88 produces a holographic image 90 within cavity 27 of first compartment 14. The three-dimensional holographic image 90, which is a virtual image, will appear to be floating within container 12 or within a beverage or fluid within first compartment 14. When illuminated, light source 64 will enhance holographic image 90. Further, film 88 can be formed such that holographic image 90 does not appear unless light source 64 is illuminated. Film 88 may be incorporated within the label of the bottle as well.

In operation, the fluid in container 12 can be illuminated by providing a submersible container 12 having a first compartment 14 containing a fluid and a second compartment 36 sealably attached to the first compartment 14. A light source 64 and an energy source 72 electrically connected to light source 64 are secured in second component 36. A switch is also provided for activating the light source. The switch has a pull ring 84 connected to a non-conductive strip 80 interposed between a pole 73, 75 on the battery 74 and a lead 68, 70 on the light source 64.

Next, pull ring 84 is pulled which conveys force on the intermediate member 82 and thus on non-conductive member 80 such that non-conductive member 80 is removed from its position between pole 73, 75 on the battery and the respective lead 68, 70 on the light source. Lead 68, 70 is spring loaded such that it contacts pole 73, 75 of battery. This enables current to flow between battery 74 and light source 64 effecting illumination of the fluid in first compartment 14 via the translucent portion of bulbous protrusion 52. Illumination of light source 64 also creates a holographic image 90, which is embedded in film 88, within first compartment 14.

Thus, the present invention is well adapted to carry out the objects and attain the ends and advantages mentioned as well as those inherent therein. While preferred embodiments of the present invention have been illustrated for the purpose of the present disclosure, changes in the arrangement and construction of parts and the performance of steps can be made by those skilled in the art, which changes are encompassed within the scope and spirit of the present invention as defined by the appended claims.

What is claimed is:

1. A disposable liquid beverage container comprising:
   a first compartment for sealably containing a beverage;
   a second compartment adjacent said first compartment;
   a barrier separating said first compartment and said second compartment, said barrier having a translucent portion;
   a light source disposed in said second compartment, said light source comprising an LED;
   an energy source electrically connected to said light source for providing current to said light source, said energy source disposed in said second compartment, said energy source comprising a lithium based battery having an operating temperature range from about −15° F. to about 80° F.; and
   switch means for activating said light source such that said light source shines through said translucent portion of said barrier and illuminates a fluid disposed in said first compartment of said container, said switch means comprising a pull tab.

2. The container of claim 1 wherein said pull tab comprises a non-conductive strip disposed between a terminal on said lithium battery and a lead to said LED such that removal of said strip completes a circuit by effecting connection between said terminal and said lead resulting in illumination of said LED.

3. The container of claim 2 wherein said second compartment is sealed to prevent liquid from contacting said light source and said energy source.

4. The container of claim 3 wherein said first compartment is adapted for maintaining a pressure of a carbonated beverage.

5. The container of claim 4 further comprising a film having a holographic image incorporated therein, said film attached to said first compartment such that said holographic image appears within said first compartment when said LED is illuminated.

6. The container of claim 4 further comprising reflective means for reflecting light toward said first compartment.

7. The container of claim 6 wherein said compartment includes a bulbous protrusion extending into said first compartment, said LED disposed in said bulbous protrusion.

8. The container of claim 1 wherein said switch means comprises a switch positioned on a bottom portion of said compartment such that said switch is activated causing illumination of the LED either when said container is set down or when the container is lifted.

9. An apparatus for sealably containing a beverage comprising:
   a container sealably partitioned into a first compartment for containing the beverage and a second compartment;
   a light source positioned within said second compartment;
   a lithium battery having an operating temperature range from about −15° F. to about 80° F. for providing current to said light source, said battery positioned within said second compartment; and a switch activating said light source such that said light source illuminates the beverage contained within said first compartment, said switch comprising a single use pull tab wherein said pull tab is connected to a non-conductive material positioned between a terminal on said battery and a lead to said light source such that pulling said pull tab effects current flow between said battery and said light source and illuminates the beverage contained in said first compartment.

10. The apparatus of claim 9 wherein said light source comprises an LED.

11. The apparatus of claim 9 wherein said first compartment is adapted for maintaining a pressure of a carbonated beverage.

12. The apparatus of claim 9 wherein said second compartment is sealed to prevent liquid from contacting said light source and said energy source.

13. The apparatus of claim 9 further comprising reflective means for reflecting light toward said first compartment.

14. The apparatus of claim 9 wherein said second compartment includes a bulbous protrusion extending into said first compartment, said LED disposed in said bulbous protrusion.

15. The apparatus of claim 9 further comprising a holographic film attached to said first compartment such that said film produces a holographic image within said first compartment when said light source is illuminated.

16. The apparatus of claim 9 wherein said switch is positioned on a bottom portion of said second compartment such that said switch is activated causing illumination of said LED when said container is lifted.

17. An apparatus for containing a beverage comprising:

a container sealable partitioned into a first compartment containing a beverage and a second compartment;

an LED positioned within said second compartment;

a lithium battery for energizing said LED; and a single-use switch, said switch comprising a pull tab connected to a non-conductive strip, said strip interposed between a terminal on said battery and a lead on said LED, such that pulling said pull tab to remove said strip from between said terminal and said lead, affects current flow between said battery and said LED, and illuminates the beverage in said first compartment.

18. The apparatus of claim 17 wherein said first compartment is adapted for maintaining a pressure maintaining a pressure of the carbonated beverage.

19. The apparatus of claim 18 further comprising reflective means for reflecting light toward said first compartment.

20. The apparatus of claim 19 wherein said second compartment is sealed to prevent a liquid from contacting said LED and said battery.

21. The apparatus of claim 20 further comprising a film having a holographic image embedded therein, said film attached to said first compartment such that said holographic image appears within said first compartment when said LED is illuminated.

22. The apparatus of claim 20 wherein said second compartment includes a bulbous protrusion extending into said first compartment, said LED disposed in said bulbous protrusion.

23. A method of illuminating a fluid in a container comprising:

providing a submersible container having a first compartment containing the fluid, a second compartment sealably attached to said first compartment, a light source secured in said second compartment, a battery secured in said second compartment and electrically connected to said light source, and a switch for activating said light source, said switch having a pull ring connected to a non-conductive strip interposed between a pole on said battery and a lead on said light source; and pulling said pull ring of said switch whereby said non-conductive strip is removed from between said pole on said battery and said lead on said light source such that current flows between said battery and said light source effecting illumination of the fluid contained in said first compartment.

24. The method of claim 23 wherein said battery is a lithium battery having an operating temperature range from about −150° F. to about 80° F.

25. The method of claim 23 wherein said second compartment is sealed to prevent a fluid from contacting said energy source and said light source.

26. The method of claim 23 wherein said first compartment is adapted for maintaining a pressure of a carbonated fluid.

27. The method of claim 23 wherein said light source further comprises reflective means for reflecting the light toward said first compartment.

28. The method of claim 23 wherein said second compartment includes a bulbous protrusion extending into said first compartment, said light source comprising an LED disposed in said bulbous protrusion.

29. The method of claim 23 wherein said container is disposable.

30. The method of claim 23 further comprising displaying a holographic image within said first compartment when said light source is illuminated.

31. The method of claim 30 wherein said first compartment further comprises a film attached thereto, said film for creating the holographic image.

32. A method of displaying a holographic image within a container comprising:

providing a container having a first compartment, a holographic film attached to said first compartment, a second compartment sealably attached to said first compartment, a light source disposed in said second compartment and electrically connected to said energy source, and a switch for activating said light source; and activating said light source by energizing said switch such that light from said light source illuminates said first compartment and produces the holographic image within said first compartment.

33. The method of claim 32 wherein said container is a disposable beverage container adapted for maintaining the pressure of a carbonated fluid.

34. The method of claim 33 wherein said energy source is a lithium battery having an operating temperature range from about −15° F. to about 80° F.

35. The method of claim 32 wherein said compartment is sealed to prevent a liquid from contacting said energy source and said light source.

36. The method of claim 32 wherein said light source is an LED.

* * * * *

UNITED STATES PATENT AND TRADEMARK OFFICE
CERTIFICATE OF CORRECTION

PATENT NO. : 6,254,247 B1  
DATED : July 3, 2001  
INVENTOR(S) : Anthony Reed Carson Page 1 of 1

It is certified that error appears in the above-identified patent and that said Letters Patent is hereby corrected as shown below:

<u>Claim 24,</u>  
Line 3, delete "-150°F" and substitute -- -15°F -- therefor.

Signed and Sealed this

Ninth Day of April, 2002

Attest:

Attesting Officer

JAMES E. ROGAN  
*Director of the United States Patent and Trademark Office*